United States Patent [19]

Gordon et al.

[11] 4,238,180
[45] Dec. 9, 1980

[54] MANDREL WITH IDENTICAL EXPANDING SEGMENTS

[75] Inventors: John H. Gordon, 855 Brandywine Rd., Downingtown, Pa. 19335; Ronald L. Roberts, Downingtown, Pa.; Winfield S. Frybarger, Jr., West Chester, Pa.

[73] Assignee: John H. Gordon, Downingtown, Pa.

[21] Appl. No.: 1,956

[22] Filed: Jan. 8, 1979

[51] Int. Cl.² .................. B29C 17/00; B29D 23/00
[52] U.S. Cl. ................................ 425/403; 425/393; 425/DIG. 218; 249/180; 249/184
[58] Field of Search ............. 425/392, 393, 403, 417, 425/DIG. 218; 249/180, 181, 182, 184, 185; 162/405

[56] References Cited

U.S. PATENT DOCUMENTS

| | | | |
|---|---|---|---|
| 693,571 | 2/1902 | Shaw | 162/405 |
| 1,144,862 | 6/1951 | Peoples et al. | 249/181 |
| 1,698,999 | 1/1929 | Hothersall . | |
| 2,205,535 | 9/1965 | Niessner et al. . | |
| 2,271,066 | 1/1942 | Ehrenhaft | 425/417 X |
| 3,109,477 | 11/1963 | Aoera et al. | 425/393 X |
| 3,484,900 | 12/1969 | Sands et al. . | |
| 3,728,059 | 4/1973 | de Putter . | |
| 3,732,054 | 5/1973 | Lyng | 425/393 |
| 3,852,016 | 12/1974 | Delauzun | 425/393 |
| 3,960,472 | 6/1976 | O'Connor et al. | 425/403 X |
| 3,989,439 | 11/1976 | Schmitzberger . | |
| 4,032,282 | 6/1977 | Wilson et al. . | |
| 4,063,862 | 12/1977 | Johansson . | |
| 4,080,140 | 3/1978 | Wilson et al. . | |

*Primary Examiner*—J. Howard Flint, Jr.
*Attorney, Agent, or Firm*—Weiser, Stapler & Spivak

[57] ABSTRACT

A mandrel for forming an annular groove in the bell of a plastic pipe which comprises a plurality of identically formed segments. The segments are radially urged identically from an initial position which is inwardly of the bell to an expanded position wherein the segments cooperate and interact to form an expanded ring of diameter greater than the pipe bell to thereby impress a circular groove therein. An actuating shaft rotatively reciprocates in unison a pair of cam plates, which cam plates are characterized by a plurality of arcuately curved guide slots formed therein. The segments include follower pairs which respectively ride within the guide slots to urge the segments from their initial positions to their expanded positions and back upon rotative reciprocation of the cam plates.

35 Claims, 9 Drawing Figures

MANDREL WITH IDENTICAL EXPANDING SEGMENTS

BACKGROUND OF THE INVENTION

The present invention relates generally to the art of forming bells on plastic pipes, and more particularly, is directed to an apparatus suitable to form an internal groove simultaneously with the belling of the pipe.

It is the usual practice to extrude plastic pipes in elongate configuration of desired diameter and then to cut the extruded product into individual lengths of convenient size suitable for handling, shipping and installing, for example twenty foot lengths. As each length of pipe is cut, it is presently the practice to enlarge or "bell" one end sufficiently to join adjacent pipe sections by receiving an unenlarged end of another similar length of pipe. The inside diameter of the bell is formed sufficiently large to receive easily one end of the next adjacent section of pipe with sufficient clearance to allow the appliction of packing, sealing materials, gaskets or other materials designed to prevent leakage at the pipe joints when the pipe lengths are joined to form a pipe line. In many applications, the seal between adjacent lengths of pipe is provided by expanding an internal groove in the bell of suitable configuration and design to permit the pipe joint to be easily and rapidly made and to prevent leakage upon completion of the system.

While experience has proved that the use of a formed gasket seated within an annular recess or groove formed in the bell of a pipe is an efficient and suitable construction for sealing joints between adjacent plastic pipe lengths, prior workers have encountered difficulties in the efficient formation of such annular grooves. It is usual to employ a single mandrel both to form the shaped bell and at the same time, to simultaneously also form the expanded groove for receipt therein of the annular gasket. Prior workers in the art have developed mandrels with various types of expanding segments in an effort to provide a composite, practical device which can rapidly and precisely form the required bell and groove in a single operation in a rapid and cost effective manner. Such prior mandrels have included equipment which utilizes pluralities of segment groups which are movable radially inwardly and outwardly and which cooperate to perform the required function of forming an expanded internal groove in the bell of the pipe as the pipe bell is formed by the mandrel. However, such prior art devices have suffered from construction and operating difficulties. Many devices were designed with two sets of completely different segments which operated in different paths and at different speeds. Sometimes, it was difficult to maintain precise alignment of the two groups of segments in their groove forming positions which misalignment could result in irregularities produced in the formation of the groove. Any imperfections or irregularities in the formed annular groove could result in imprefectly made joints. Upon utilizing the pipe sections to form a pipe system, such imperfections could cause a leakage, loss of pressure or other deleterious effects. Additionally, the prior machines which have been developed, because of their complexity, resulted in apparatus that was extremely costly in construction and bulky in installation and in use.

SUMMARY OF THE INVENTION

The present invention is directed generally to a device suitable for forming bells at one end of a length of plastic pipe, and more particularly, is directed to a mandrel including a plurality of identical, cooperating, expanding segments for forming an annular groove in the pipe bell as the bell itself is being formed.

In the apparatus of the present invention, an actuating shaft is axially positioned and is rotatively reciprocated through an angle of approximately forty-five degrees relative to a stationary mandrel nose. The shaft simultaneously rotates a pair of spaced pins, which pins are respectively secured to first and second spaced cam plates in a manner to also rotatively reciprocate the cam plates. Each of the cam plates is formed to provide a plurality of similar curved grooves, each groove of which arcuately curves from a first terminus to a second terminus, the first terminus being positioned radially inwardly from the second terminus.

A plurality of identical, cooperating, groove forming segments are simultaneously radially movable along respective guide pins. Each segment is provided with a pair of opposed cam followers which are positioned and sized to ride within the respective arcuate grooves in the first and second cam plates. Accordingly, as the cam plates are rotatively reciprocated through forty-five degrees upon rotative reciprocation of the actuating shaft, the interaction of the pairs of cam followers within the cam grooves of the first and second cam plates causes the plurality of similar segments to reciprocate radially upon their respective guide pins.

Each of the groove forming segments is identically formed and comprises a radially inwardly facing base which is radially drilled or otherwise formed to provide a radially aligned channel within which a guide pin is received in a manner to provide radial reciprocation of each segment relative to its associated guide pin when the cam plates are rotatively reciprocated. The base terminates outwardly in a flat face or slide that is formed at an angle from the tangent to the groove diameter defined when the segments are urged to their expanded positions, for example, an angle of twenty-two and one-half degrees.

The segments each include an integral curved extension foot with the outer surface curved to define an arc or portion of the circumference of the groove diameter. Accordingly, if eight similar segments are employed in the apparatus, the outer surface of the extension foot of each segment will be equal to one-eighth of the circumference of the groove diameter. The trailing edge of the arc portion of each extension is radially inwardly shaped to provide a cooperating flat surface or slide surface positioned at an angle of twenty-two and a half degrees from the tangent to the groove diameter circle whereby the flat, angled slide surface of the extension foot of one segment touches and slides relative to the angled, flat base surface of the next adjacent segment as the segments are reciprocated between their radial inward positions and their expanded, groove forming positions.

The plurality of similar segments are radially reciprocated in unison upon rotative reciprocation of the first and second cams in a manner whereby the extension foot flat face or slide of one segment touches and slides upon the base flat face or slide of the next adjacent segment during all radial movements of the segment. When the segments are reciprocated to the respective outermost positions, it is the essence of this invention that the circular arc portions of each segment extension foot will circularly align to form a smooth, continuous expanded circle to press and form the desired annular groove into the bell end of the pipe as the bell itself is being formed by the same mandrel.

In accordance with usual practice, the end of the plastic pipe to be belled is suitably heated or otherwise treated to facilitate impressing the bell shape upon the end of the pipe. The pipe end, after being heated, is rendered sufficiently pliable to enable the mandrel both to impress the bell shape and, upon radial expansion of the segments, also to impress the internal, annular groove. When the plurality of cooperating segments are radially inwardly withdrawn and the shaped bell is sufficiently cooled, the pipe can be withdrawn from the mandrel with the impressed shapes formed therein. An O-ring gasket or other shaped sealing member or gasket can then be applied within the annular groove in known manner to thereby make up a complete bell end ready for joining in a field connection in known manner.

It is therefore an object of the present invention to provide an improved mandrel capable of forming an internal groove in a belled end of a pipe of the type set forth.

It is another object of the present invention to provide a novel mandrel with a plurality of identical reciprocating segments suitable to form an annular groove in a pipe bell.

It is another object of the present invention to provide a novel mandrel with identical segment means reciprocal relative to the mandrel nose including rotative reciprocating means to radially reciprocate the segments.

It is another object of the present invention to provide a novel mandrel with identical expanding segments which are simultaneously expandable and contractable for producing an outwardly deformed annular groove in a plastic pipe bell end.

It is another object of the present invention to provide a novel mandrel with identical expanding segments with means to radially reciprocate the segments from a contracted position to an expandable position and means to reinforce the segments when in the expanded position.

It is another object of the present invention to provide a novel mandrel with identical expanding segments wherein each segment comprises a base slide surface and an extension foot slide surface wherein a slide surface of one segment is continuously in contact with a slide surface of the next adjacent surface.

Other objects and a fuller understanding of the invention will be had by referring to the following description and claims of a preferred embodiment, taken in conjunction with the accompanying drawings wherein like reference characters refer to similar parts throughout the several views and in which:

DESCRIPTION OF THE PREFERRED EMBODIMENT OF THE INVENTION

Figure 1:
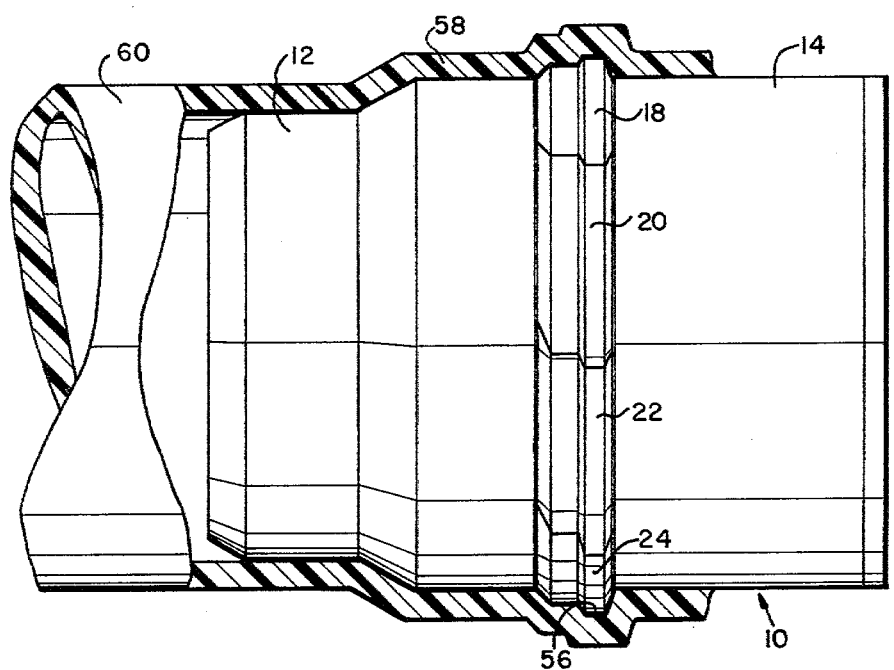
FIG. 1 is a side elevational view, partly broken away, of the mandrel in use to form a bell with integral annular groove in the end of a length of plastic pipe.

Although specific terms are used in the following description for the sake of clarity, these terms are intended to refer only to the particular structure of the invention selected for illustration in the drawings, and are not intended to define or limit the scope of the invention.

Figure 2:
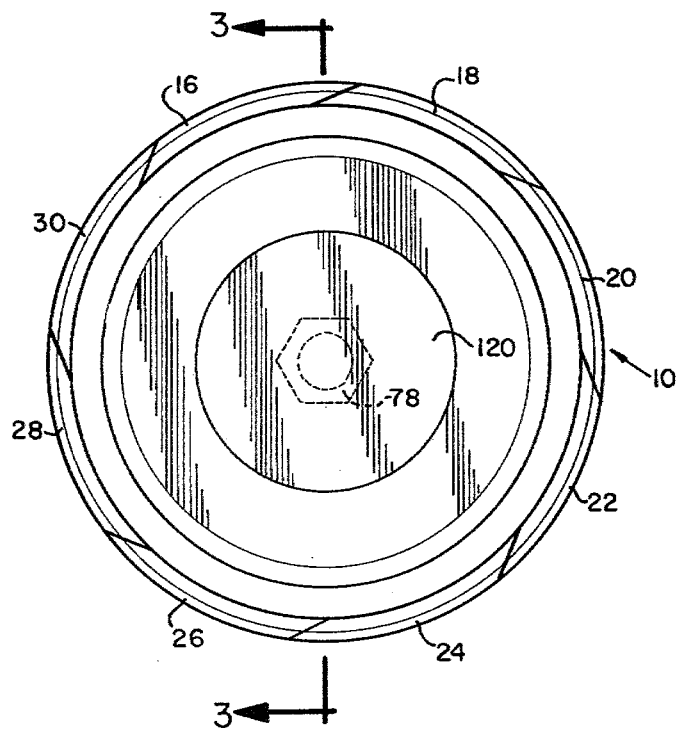
FIG. 2 is an end elevational view of the mandrel of FIG. 1.
Figure 6:
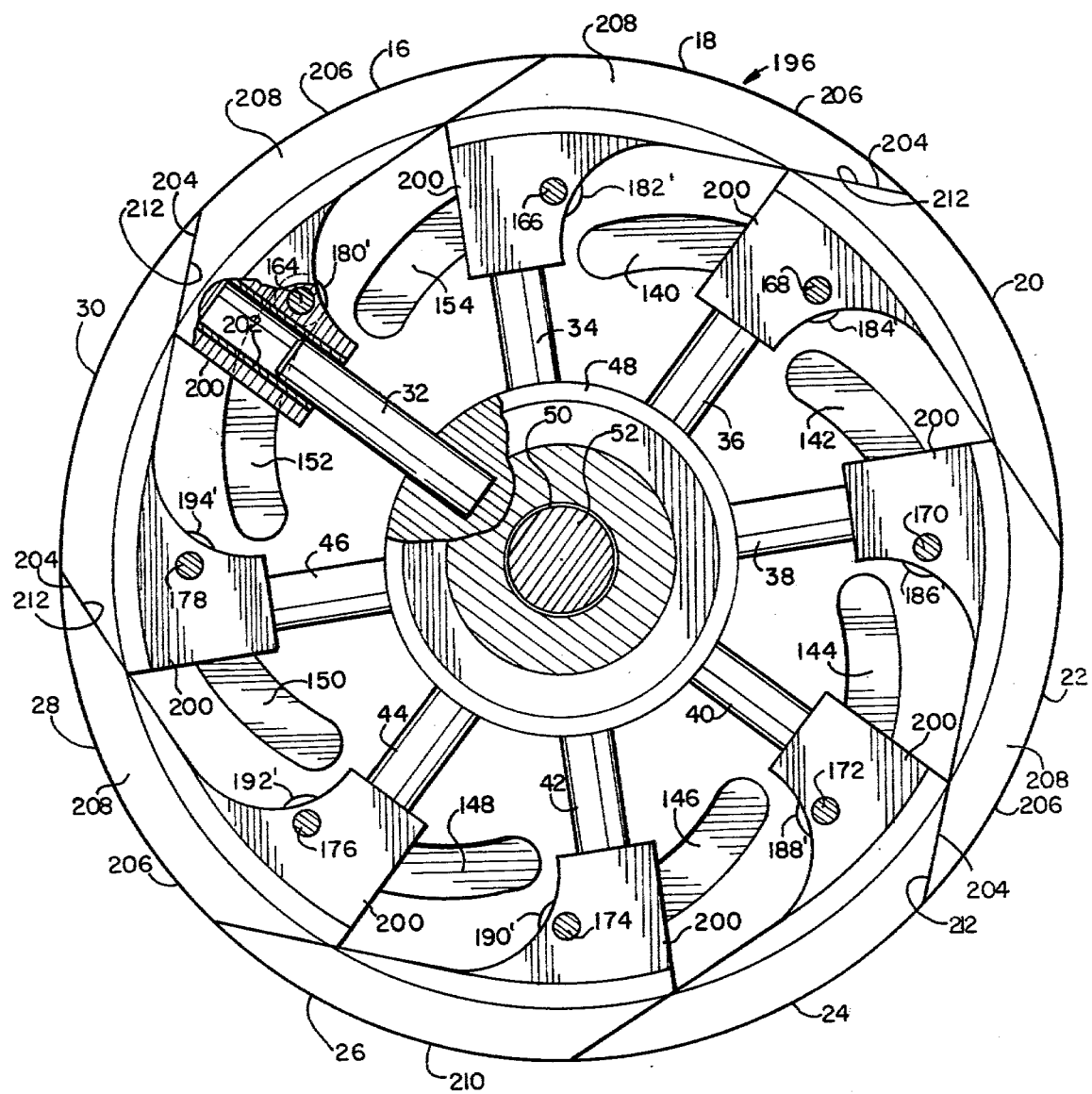
FIG. 6 is an enlarged cross-sectional view taken along line 6—6 on FIG. 2, looking in the direction of the arrows, partly broken away and showing the segments in expanded position.

Referring now to the drawings, these is shown in FIGS. 1, 2 and 6 a mandrel 10 which comprises generally a forward, shaped nose means or profile 12, a rearward body means 14 and a plurality of segment means comprising identical, expanding segments 16, 18, 20, 22, 24, 26, 28 and 30. As indicated, the expanding segments 16-30 are positioned intermediate the profile 12 and the mandrel body 14, are aligned in a plane positioned at ninety degrees to the axis through the profile and body and are radially reciprocal on respective guide pins 32, 34, 36, 38, 40, 42, 44, 46 (FIG. 6) in the manner hereinafter more fully set forth. The guide pins are equidistantly circularly spaced and radially project from a central hub 48, which hub remains in stationary relationship respectively to the nose or nose means 12 and the body or body means 14 of the mandrel construction 10. The hub includes and axial bore 50 through which the actuating shaft 52 is rotatively operable.

Figure 7:
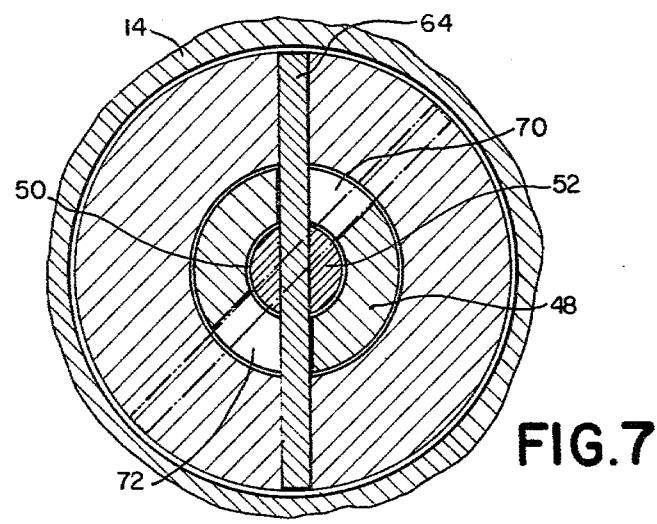
FIG. 7 is an enlarged, cross-sectional view taken along line 7—7 on FIG. 3, looking in the direction of the arrows.
Figure 8:
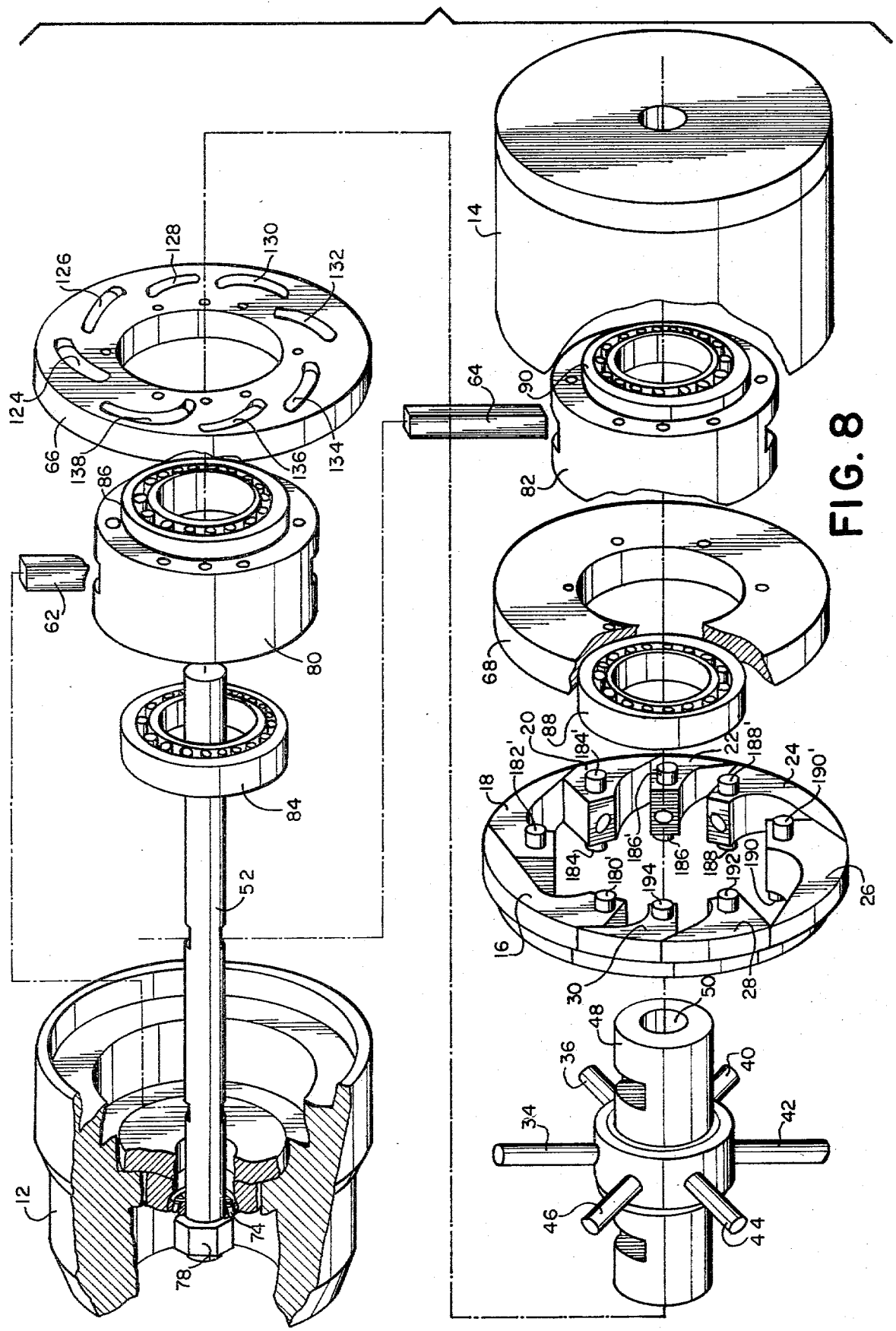
FIG. 8 is an exploded, isometric view of the mandrel of the present invention, partly broken away.

The actuating shaft 52 is axially aligned through the front profile 12 and rear body 14, and is rotatively reciprocated through an angle of approximately fifty degrees by a crank 54 or other suitable, known mechanism (not illustrated) to expand the segments 16-32 from respective radially inward positions to respective expanded positions for forming the internal, annular groove 56 in the bell end 58 of a plastic pipe 60. A pair of spaced, long keys or pins 62, 64 (FIG. 3) are secured in the actuating shaft 52 and are rotatively turned thereby to rotatively reciprocate the circular cams 66, 68 as hereinafter more fully set forth. As best seen in FIG. 7, the hub 48 is provided with diametrically opposed, arcuate openings 70, 72 to permit the keys 62, 64 to rotatively reciprocate through an angle of approximately fifty degrees relative to the stationary hub 48. Accordingly, as the actuating shaft 52 is rotatively reciprocated by the crank 54 and associated mechanism of suitable, known type to rotatively reciprocate the crank 54, the long keys or pins 62, 64 will also rotatively reciprocate while the hub 48 and the associated, radially oriented guide pins 32-46 remain stationary. Front and rear bearings 74, 76 (FIGS. 3 and 8) are provided to facilitate shaft rotation relative to the nose 12, the body 14 and the plurality of mandrel guide pins. A nut 78 conventionally secures the end of the shaft 52 at the front bearing 74 to hold the parts in operating arrangement.

Figure 3:
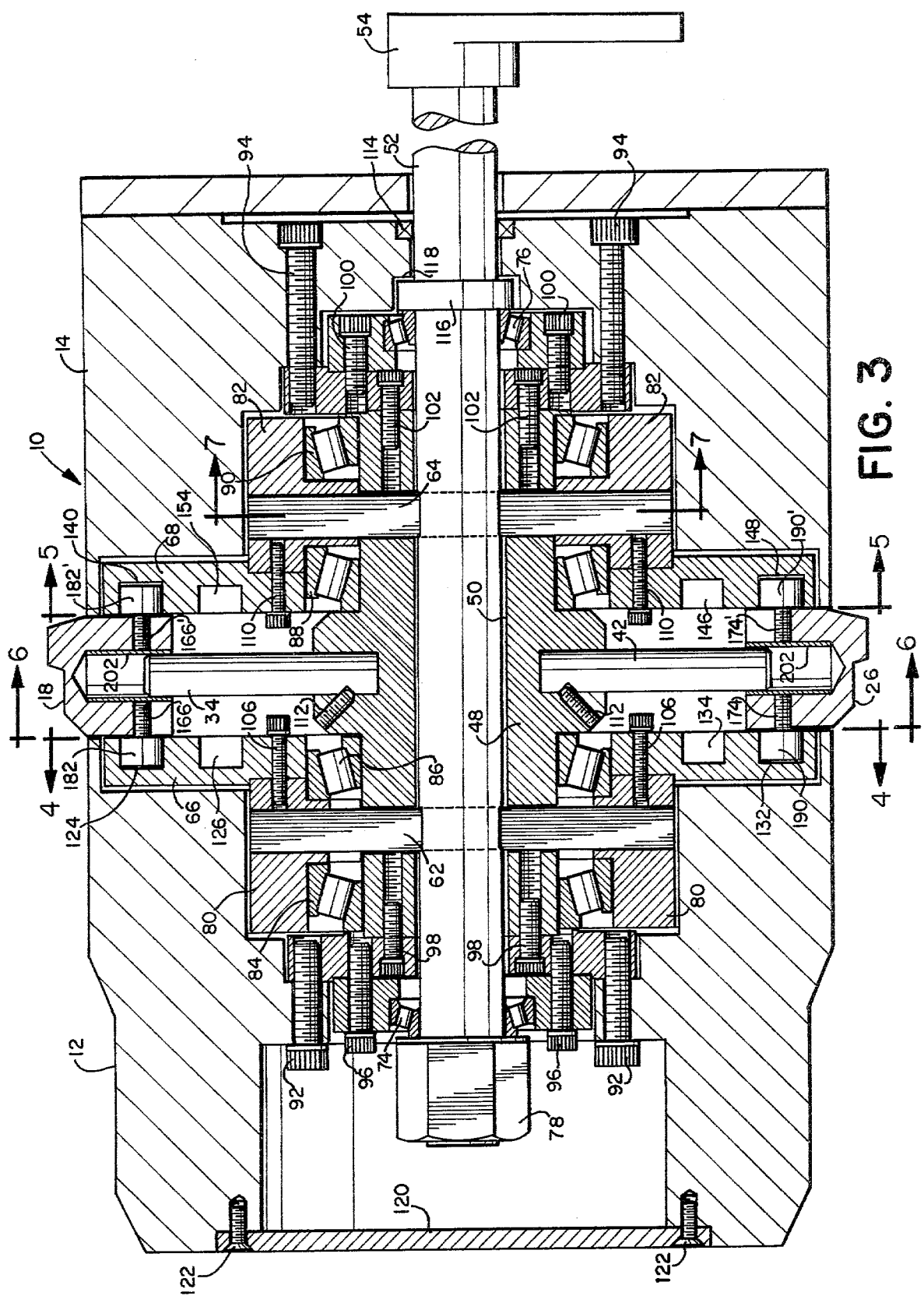
FIG. 3 is an enlarged, cross-sectional view taken along line 3—3 on FIG. 2, looking in the direction of the arrows.

The long keys 62, 64 are seated within the annular front and rear brackets or collars 80, 82 in a manner to rotatively reciprocate the brackets 80, 82 when the actuating shaft 52 is rotatively reciprocated. The front bracket 80 is rotatively carried relative to the stationary hub 48 by the front and rear bearings 84, 86. Similarly, the rear bracket 82 is rotatively carried relative to the stationary hub 48 by its associated front and rear bearings 88, 90. As best seen in FIG. 3, the nose or profile 12 is secured in stationary relationship to the hub 48 by the plurality of machine screws 92. The body 14 is maintained in stationary relationship to the stationary hub 48 by the plurality of rear machine screws 94. The plurality of machine screws 96, 98 secure the front bearing 74 and the plurality of the rear machine screws 100, 102 secure the rear bearing 76. Accordingly, as the activating shaft 52 is rotatively reciprocated by the crank 54, the nose or profile 12, the body 14, the front bearing 74 and the rear bearing 76 all remain stationary. The long keys 62, 64 are rotated by the shaft 52 and in turn rotatively reciprocate their respective associated front bracket or collar 80 and rear bracket or collar 82.

Figure 4:
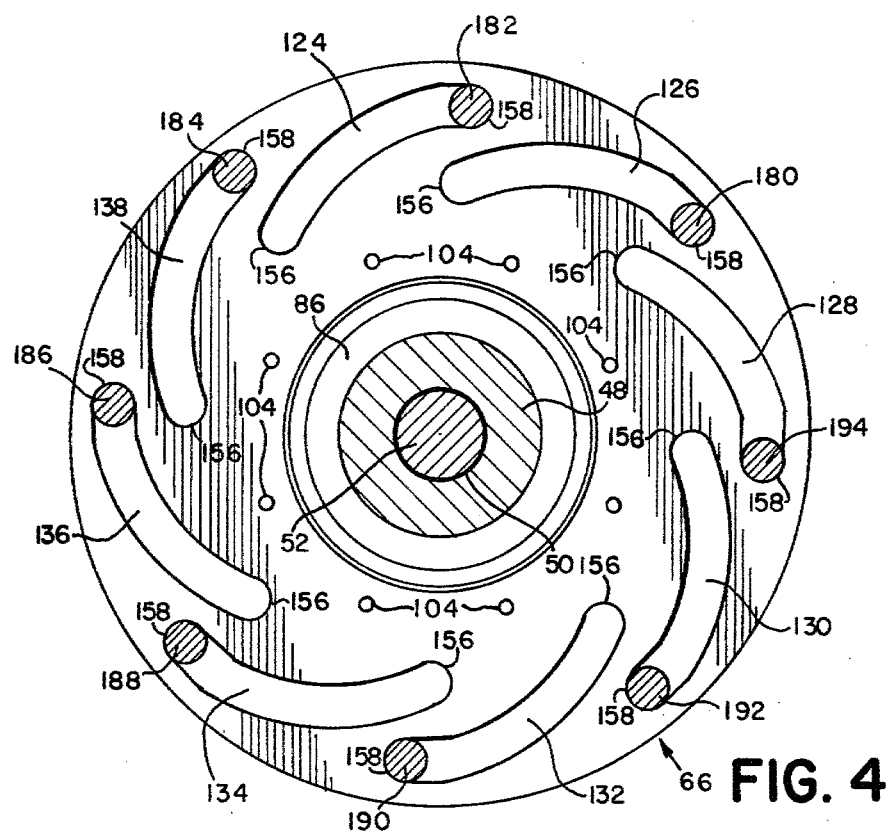
FIG. 4 is a cross-sectional view taken along lines 4—4 of FIG. 3, looking in the direction of the arrows.
Figure 5:
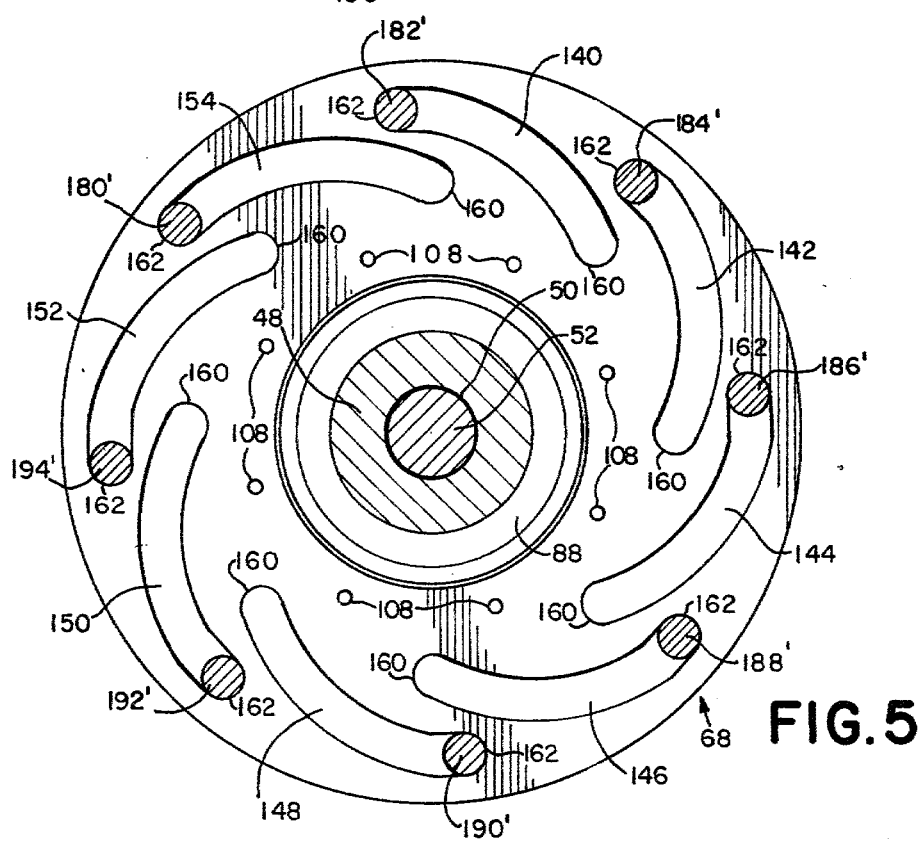
FIG. 5 is a cross-sectional view taken along line 5—5 on FIG. 3, looking in the direction of the arrows.

Referring now to FIGS. 3 and 4, a first circular cam plate 66 is illustrated and includes a plurality of spaced openings 104 of size to receive therein machine screws 106 for securing purposes. The machine screws 106 affix the cam plate 66 to the front bracket 80 whereby the cam plate 66 is rotatively reciprocated upon rotative reciprocation of the actuating shaft 52 and the bracket 80. Similarly, as seen in FIG. 5, the second circular cam plate 68 is provided with a plurality of spaced openings 108 through which the machine screws 110 turn to secure the second cam plate 68 to the rear bracket 82. Accordingly, the cam plates 66, 68 rotate in unison upon rotative reciprocation of the shaft 52 and the front and rear brackets 80, 82. An oil seal 114 may be conventionally applied to prevent leakage between the shaft 52 and the body 14. A collar 116 is affixed to the shaft 52 and turns within a suitably configured recess 118, and in cooperation with the bearing 76, the bearing 74 and the nut 78, functions to maintain the longitudinal alignment of the shaft 52 relative to the mandrel nose 12 and body 14. A front cover 120 may be secured to the front of the nose 12 by a plurality of machine screws 122 to provide front closure. If desired, a seal, such as an O-ring gasket (not shown) can be employed in conjunction with the cover to provide a front seal.

As illustrated in FIGS. 3 and 4, the front circular cam plate 66 is provided with a plurality of similar arcuate openings or slots 124, 126, 128, 130, 132, 134, 136 and 138. Similarly, the rear circular cam plate 68 is provided with a plurality of similar arcuate openings for slots 140, 142, 144, 146, 148, 150, 152 and 154. See FIG. 5. The arcuate slots 124-138 in the cam plate 66 and the arcuate slots 140-154 in the cam plate 68 are utilized to radially reciprocate the plurality of expanding segments 16-30 upon their respective guide pins 32-46 in the manner hereinafter more fully set forth as the circular cam plates 66, 68 are rotatively reciprocated by the actuating shaft 52.

Each of the plurality of arcuate slots 124-138 formed in the circular cam plate 66 extend in length through a distance of approximately fifty degrees from respective radially inwardly positioned termini 156 to respective radially outwardly positioned termini 158. The arcuate slots 140-154 formed in the rear circular cam plate 68 are similar in size and configuration to the slots 124-138 and extend respectively from their radially inwardly positioned termini 160 to the respective radially outwardly outwardly positioned termini 162. The slots 124-138 and 140-154 cooperate and are suitably positioned and configured to radially reciprocate the plurality of expanding segments 16-30 upon rotative reciprocation of the actuating shaft 52. While the invention has been illustrated and described with a plurality of eight expanding segments 16-30 and eight corresponding slots 124-138 and 140-154 in the respective circular cams 66, 68, it will be appreciated that it may be possible to design a similar annular groove forming system using either more or fewer expanding segments. Accordingly, the eight segments shown and described should be considered as illustrative only and not necessarily limiting.

The resepctive radial distances from the longitudinal axis of the shaft 52 between the respective inward termini 156 and the respective outward termini 158 of the slots formed in the cam plate 68 defines the radial limits of travel of the expanding segments 16-30. In a preferred embodiment, each of the arcuate slots 124-138 and the arcuate slots 140-154 are arcuately formed through a distance of approximately forty to fifty degrees. As illustrated, for a distance of approximately forty-four degrees the walls defining the slots are arcuate, with the remaining six degrees at the respective outward termini 158, 162 being formed with straight rather than arcuate side all configuration. As illustrated, each outward terminus 158 of a slot 124-138 formed in the cam plate 66 radially outwardly overlies the respective inward terminus 156 of the next adjacent arcuate slot. Similarly, the slots 140-154 provided in the circular cam plate 68 are each formed with a respective outward terminus 162 radially overlying a respective inward terminus 160 of the next adjacent slot. Accordingly, as the circular cams 66, 68 are rotated in unison, the respective slots 124-138 and 140-154 are also simultaneously rotated to radially, cooperatively reciprocate the plurality of the expanding segments 16-30 upon their respective guide pins 32-46.

Figure 6A:
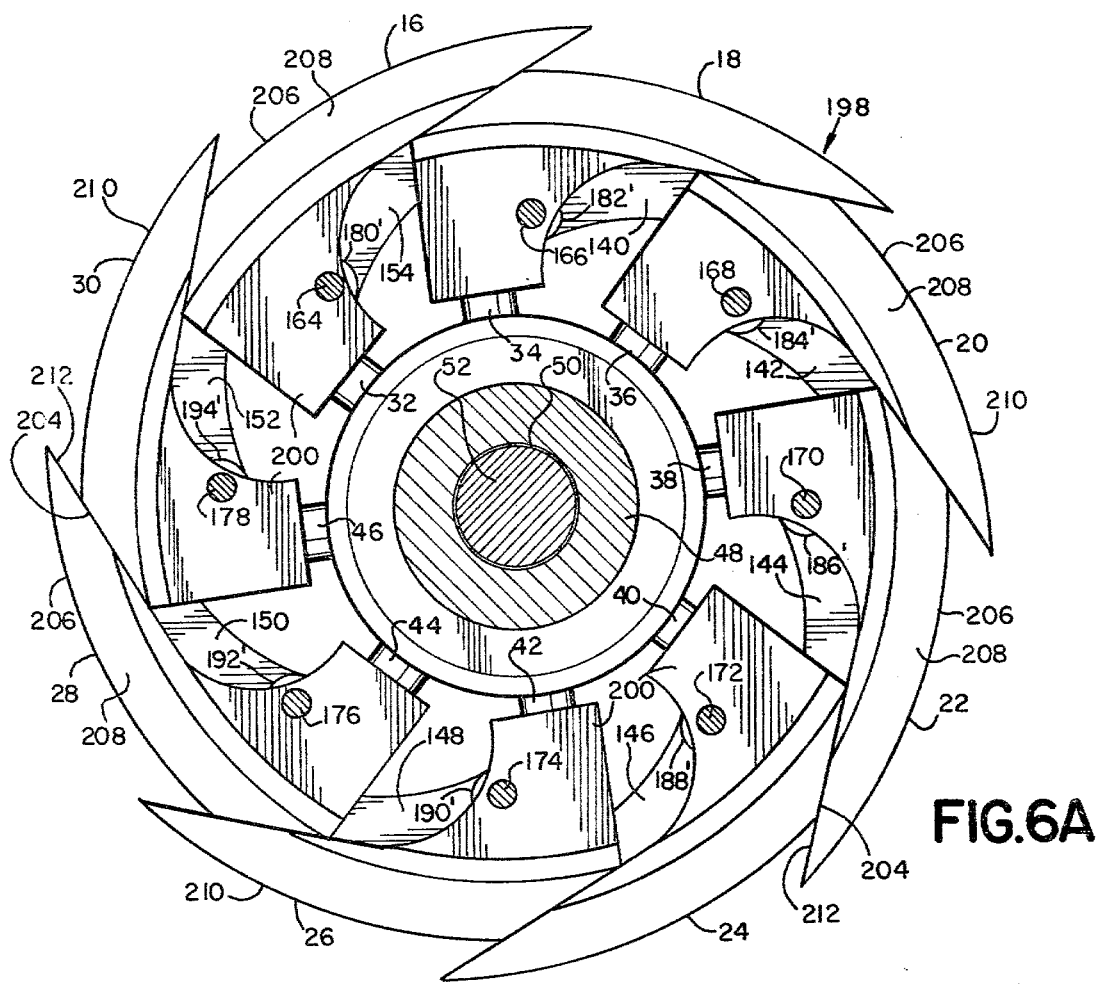
FIG. 6A is an enlarged, cross sectional view similar to FIG. 6, showing the segments in retracted position.

Referring now to FIGS. 6 and 6A, and referring also to FIGS. 3, 4 and 5, the operation of the expanding segments 16-30 will now be described. As shown, each segment 16-30 is provided with a transverse shaft or pin 164, 166, 168, 170, 172, 174, 176, 178, which shafts or pins extend forwardly and rearwardly sufficiently to mount respectively the pairs of cooperating forward and rearward followers 180, 180', 182, 182', 184, 184', 186, 186', 188, 188', 190, 190', 192, 192', and 194, 194' (see FIG. 3). As illustrated, the followers 180-194 ride respectively within the arcuate slots 124-138 formed in the front circular cam plate 66. Similarly, the rearwardly facing followers 180'-194' ride respectively within the arcuate slots 140-154 of the rearward circular cam plate 68. Accordingly, as the circular cams 66, 68 are rotatively reciprocated in unison, equal and simultaneous forces are applied by the circular cams 66, 68 upon the plurality of expanding segments 16-30 through the follower connected pins 164-178 in equal, balanced arrangement. As hereinbefore set forth, the arcuate slots 124-138 and the arcuate slots 140-154 curve outwardly from radially inwardly positioned termini 156 and 160 respectively to radially outwardly positioned termini 158 and 162. Accordingly, as the circular cam plates 66, 68 are rotatively reciprocated by reciprocation of the actuating shaft 52, the expanding segments 16-30 will be caused to radially reciprocate upon their respective guide pins 32-46 between their expanded positions 196 as illustrated in FIG. 6 to their retracted positions 198 as illustrated in FIG. 6A.

As best seen in FIGS. 6 and 6A, each of the segments 16-30 is similarly formed and each comprises generally a base 200, which base is provided with a radially oriented bore 202 of size to receive therewithin respectively one of the guide pins 32-46 in a sliding engagement. This construction is designed to facilitate radial reciprocation of the segments 16-30 as the cams 66, 68 are rotatively reciprocated upon the imposition of reciprocal circular forces applied by the actuating shaft 52. Each base 200 terminates radially outwardly in an angled straight slide surface 204, which surface in the embodiment shown, slopes inwardly at an angle of twenty-two and one-half degrees from the tangent to the outer circle 206 defined by the segments 16-30 when in their expanded positions 196. Each base extends circumferentially in an integral press leg 208. The press legs 208 are each formed to provide an outer arcuate surface which extends circumferentially from the outer limit of each respective slide surface 204 in an arc representing one-eighth of the circumference of the outer circle 206 defined by the segments 16-80 when reciprocated to their expanded positions (FIG. 6), whereby when all of the segments 16-30 are urged outwardly to their expanded positions 196, all of the outer surfaces or arcs 210 of the individual segment press legs 208 circularly align to define a smooth, continuous, complete outer circle 206. The segments 210 circularly align to thereby impress a complete, smooth, internal, annular groove 56 in the pipe bell end 58 as illustrated in FIG. 1 when viewed with FIGS. 2 and 6.

Each press leg 208 terminates in a cooperating angled, straight slide surface 212, which slide surface 212 faces inwardly and slides upon the first slide surfade 204 of the next adjacent segment base as the plurality of segments are radially reciprocated. Still referring to FIGS. 6 and 6A, it will be observed that the respective straight, slide surfaces 204, 212 slide upon each other in angular sliding contact as the segments 16-30 are radially reciprocated between their respective retracted positions 198 and their respective expanded positions 196. In this manner, the outer circular arcs 210 of each of the expanding segments 16-30 form a continuous outer circle 206 when the segments are reciprocated radially outwardly to their respective expanded positions 196 for annular groove forming purposes (FIGS. 1, 2 and 6). It will also be noted in FIG. 6, that when the segments 16-30 are reciprocated radially outwardly to their expanded positions 196, adjacent segments overlap and reinforce each other whereby the base 200 of one segment radially inwardly registers with and supports the press leg 208 of the next adjacent segment.

In order to use the belling machine of the present invention, the plastic pipe 60 is first heated in accordance with well known practice to soften the plastic material sufficiently to permit formation both of the bell end 58 and the internal annular groove 56 by utilizing the nose 12, the body 14 and the plurality of expanding segments 16-30 of the mandrel 10. After the desired shapes have been impressed on the end of the plastic pipe 60, the belled end is cooled in known manner to harden the plastic and to permanently retain the formed shape. As the heated end of the plastic pipe is applied over the mandrel profile 12 and body 14, the segments 16-30 are arranged in their said retracted positions 198 (FIG. 6A). After the pipe end is fully seated upon the mandrel, the crank 54 is functioned to rotate the shaft 52 to urge the segments 16-30 to their respective expanded positions 196. See FIGS. 1, 2 and 6, thereby forming the desired annular groove 56. The belled end 58 is then cooled sufficiently in suitable manner well known to those skilled in the trade to harden the plastic material and to set the impressed shapes in the belled pipe end. After a sufficient cooling period to set the impressed shapes, the crank 54 is rotatively reciprocated to rotate the shaft 52, thereby urging the segments 16-30 to their initial, retracted positions 198. When the segments are in their respective retracted positions 198, the belled pipe end 58 can be withdrawn from the mandrel 10, and the mandrel is again ready to receive a heat softened, unbelled end of the next length of pipe to repeat the process.

Although the present invention has been described with reference to particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. In a machine for providing a bell with an annular groove in an end of a plastic pipe, the combination of
    nose means and body means shaped to form the configuration of the bell,
        said nose means and said body means being non-rotative,
        said nose means and said body means defining an operating opening therebetween;
    a plurality of identical segment means circularly arranged in the said opening to impress the annular groove in the bell,
        said segment means each being equally radially reciprocal between a respective retracted position and a respective expanded position;
    a shaft axially and centrally aligned through the nose means, the body means and the circle defined by the segment means and being rotatively reciprocal relative to the nose means and the body means;
    a plurality of radially oriented guide pins spaced about the shaft, the pins being positioned in the operating opening;
        each of said plurality of segment means being radially movable along one of said guide pins as the plurality of segment means are reciprocated between their said retracted and expanded positions; and actuating means connected to and being rotatively reciprocated by the shaft, said actuating means being engaged by each of the plurality of segment means and having means to radially reciprocate simultaneously the plurality of segment means upon rotative reciprocation of the shaft.

2. The machine of claim 1 wherein each segment means comprises a base and a press leg and wherein each press leg cantilevers in a circular direction from its base.

3. The machine of claim 2 wherein the base includes a radially aligned bore, each bore being adapted to receive one of said radially oriented guide pins therein to guide the segment means in a path or radial movement with the operating opening.

4. The machine of claim 2 wherein the base terminates radially outwardly in a first straight slide surface.

5. The machine of claim 4 wherein the first slide surface slopes angularly inwardly.

6. The machine of claim 4 wherein the first straight slide surface slopes inwardly at an angle of twenty-two and one-half degrees from the tangent to the circle defined by the plurality of segment means when arranged in their said expanded positions.

7. The machine of claim 4 wherein the press leg terminates circularly outwardly in a second straight slide surface.

8. The machine of claim 7 wherein the second slide surface slopes angularly inwardly.

9. The machine of claim 8 wherein the second slide surface of one segment means touches and slides upon the first slide surface of the next adjacent segment means as the plurality of segment means is reciprocated between respective retracted positions and respective expanded positions.

10. The machine of claim 9 wherein the said second slide surface of one segment means continously touches the said first slide surface of the next adjacent segment means.

11. The machine of claim 9 wherein the first slide surface of one segment means radially registers with the second slide surface of the next circularly adjacent segment means when the plurality of segment means is urged to the said expanded positions.

12. The machine of claim 9 wherein each base includes a radially aligned bore, the bore being adapted to receive one of said radially oriented guide pins therein to guide the segment means in a path of radial movement within the said operating opening as the segment means is reciprocated between its retracted and expanded positions.

13. The machine of claim 12 wherein the first slide surface of one segment means radially registers with the second slide surface of the next circularly adjacent segment means when the plurality of segment means is urged to the said expanded positions.

14. The machine of claim 13 wherein a portion of the said registered first slide surface of one segment means and a portion of the second slide surface of the next circularly adjacent segment means radially outwardly register with the base bore of the said one segment means.

15. The machine of claim 1 wherein the actuating means comprises a cam plate adapted to be rotatively reciprocated by the shaft, the cam plate being positioned adjacent to the said opening.

16. The machine of claim 15 wherein the cam plate is provided with openings having walls defining a plurality of non-linear slots.

17. The machine of claim 16 wherein each segment means comprises a follower, the follower of each segment means being positioned in one of the slots to radially reciprocate the segment means upon rotative reciprocation of the cam plate.

18. The machine of claim 16 wherein the slots are arcuate.

19. The machine of claim 16 wherein all of the slots are identical.

20. The machine of claim 19 wherein the slots extend in length through a distance of approximately forty to fifty degrees.

21. The machine of claim 19 wherein each slot extends from a radially inwardly positioned terminus to a radially outwardly positioned terminus.

22. The machine of claim 21 wherein the radial distance between the slot inward terminus and outward terminus is equal to radial distance of movement of a segment from its retracted position to its expanded position.

23. The machine of claim 21 wherein each slot extends arcuately through a distance of between forty and fifty degrees.

24. The machine of claim 23 wherein each slot extends in length arcuately through a distance of forty-four degrees 25. The machine of claim 24 wherein the walls defining the slot at the outward terminus are straight.

26. The machine of claim 25 wherein the straight walls extend a distance approximately equal to six degrees.

27. The machine of claim 25 wherein the actuating means further comprises a long key rotatively reciprocated by the shaft and a bracket rotated by the long key, the cam plate being secured to the bracket whereby the cam plate is rotatively reciprocated upon rotative reciprocation of the shaft.

28. The machine of claim 27 and a hub interposed between the bracket and the shaft, the hub being in stationary relationship to the said nose means and said body means.

29. The machine of claim 28 wherein the guide pins radially project from the hub.

30. The machine of claim 28 wherein the hub is provided with an opening and wherein the long key is positioned within the opening.

31. The machine of claim 30 wherein the long key is adapted to rotatively reciprocate within the said hub opening.

32. The machine of claim 1 wherein all of the segment means are adapted to travel equal radial distances as they are reciprocated between their retracted and expanded positions.

33. The machine of claim 32 and wherein each of the plurality of segment means is continuously in contact with the circularly adjacent segment means in all positions of travel.

34. The machine of claim 1 wherein all of the plurality of segment means are adapted to travel simultaneously and over paths of equal length as they are reciprocated between their retracted and expanded positions.

35. The machine of claim 1 wherein each of the plurality of segment means terminates radially outwardly in a straight surface and an arcuate surface, the arcuate surface defining an arc equal to that portion of the circle defined by each segment means when it is reciprocated to its said expanded position.

* * * * *